US 6,703,456 B2

(12) United States Patent
Mori et al.

(10) Patent No.: US 6,703,456 B2
(45) Date of Patent: Mar. 9, 2004

(54) PROCESS FOR PRODUCING CATALYST FOR α-OLEFIN POLYMERIZATION, AND PROCESS FOR PRODUCING α-OLEFIN POLYMER

(75) Inventors: Jiro Mori, Sodegaura (JP); Tomoaki Tanaka, Ichihara (JP); Yasunori Kaminaga, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 10/396,508

(22) Filed: Mar. 26, 2003

(65) Prior Publication Data

US 2004/0030067 A1 Feb. 12, 2004

(30) Foreign Application Priority Data

Aug. 6, 2002 (JP) ........................................ 2002-228328

(51) Int. Cl.$^7$ .................................................. C08F 4/42
(52) U.S. Cl. .................... 526/124.3; 526/348; 526/107; 526/128; 526/123.1; 502/103; 502/116; 502/126; 502/127; 502/115; 502/128
(58) Field of Search ............................. 526/348, 124.3, 526/107, 128, 123.1; 502/103, 116, 126, 127, 115, 128

(56) References Cited

U.S. PATENT DOCUMENTS 4,207,205 A * 6/1980 Wristers ..................... 252/429

5,965,478 A 10/1999 Goto et al.
6,187,883 B1 * 2/2001 Satoh et al. ............. 526/125.3
6,395,667 B1 5/2002 Satoh
2001/0014765 A1 * 8/2001 Fujiwara et al. ............ 585/700

FOREIGN PATENT DOCUMENTS

| EP | 0 657 473 A2 | 6/1995 |
| JP | 8-283329 A | 10/1996 |

* cited by examiner

Primary Examiner—Ling-Siu Choi
(74) Attorney, Agent, or Firm—Sughrue Mion, PLLC

(57) ABSTRACT

A process (I) for producing an α-olefin polymerization catalyst whereby (1) a titanium compound is reduced by an organomagnesium compound in the presence of an organo-silicon compound to produce a reduction solid, (2) the reduction solid is aged to produce a solid product, (3) the solid product is contacted with an ether compound, titanium tetrachloride and an organic acid halide compound, to produce an organic acid halide-treated solid, (4) the organic acid halide-treated solid is contacted with a mixture of an ether compound, titanium tetrachloride and an ester compound, or with a mixture of an ether compound and titanium tetrachloride to produce a solid catalyst component containing a titanium compound, and (5) the solid catalyst component is contacted with an aluminum compound and an electron donor compound to produce a catalyst for α-olefin polymerization. A process (II) for producing an α-olefin polymer using a catalyst produced by process (I).

5 Claims, No Drawings

PROCESS FOR PRODUCING CATALYST FOR α-OLEFIN POLYMERIZATION, AND PROCESS FOR PRODUCING α-OLEFIN POLYMER

FIELD OF THE INVENTION

The present invention relates to a process for producing a catalyst for α-olefin polymerization, and a process for producing an α-olefin polymer. In more detail, the present invention relates to (1) a process for producing a highly stereoregular α-olefin polymer, which has (i) a high bulk density. (ii) an extremely low content of a catalyst residue and an amorphous polymer, and (iii) an excellent mechanical property and processability, and (2) a process for producing a catalyst for α-olefin polymerization, which can produce said polymer.

BACKGROUND OF THE INVENTION

There are known (1) a process for producing a catalyst for α-olefin polymerization, which comprises the steps of:

(i) reducing a titanium compound containing a tetravalent titanium with an organomagnesium compound in the presence of an organosilicon compound to obtain an eutectic crystal compound of magnesium and titanium (Ti—Mg complex solid catalyst component), and (ii) contacting the eutectic crystal compound with an organoaluminum compound and an organosilicon compound (electron donor compound): and (2) a process for producing an α-olefin polymer using said catalyst (for example, JP 3-43283-B and JP 1-319508-A).

There is proposed a reduction step, wherein the above-mentioned reduction step is carried out in the presence of an ester compound in addition to the organosilicon compound.

However, each of the above-mentioned processes has a problem that the higher activity an obtained catalyst has, the lower bulk density an obtained α-olefin polymer has.

As a process for producing an olefin polymer having a high bulk density, there are proposed (1) a polymerization process of ethylene using a solid catalyst component, wherein a titanlum-magnesium compound is supported on a silica gel, and (2) a polymerization process of propylene using a solid catalyst component, wherein a silica gel is impregnated with a titanium-magnesium compound.

However, those processes have problems that (1) an obtained catalyst has a low polymerization activity, and (2) an obtained polymer contains such a large quantity of silica gel that an obtained product is not preferable in view of quality and appearance.

SUMMARY OF THE INVENTION

An object of the present invention is to provide (1) a process for producing a highly stereoregular α-olefin polymer, which has (1) a high bulk density, (ii) an extremely low content of a catalyst residue and an amorphous polymer, and (iii) an excellent mechanical property and processability, and (2) a process for producing a catalyst for α-olefin polymerization, which can produce said polymer.

The present invention provides a process for producing a catalyst for α-olefin polymerization, which comprises the steps of:

(1) reducing a titanium compound represented by the following formula (1) with an organomagnesium compound in the presence of an organosllicon compound having an Si—O bond to produce a reduction solid (hereinafter, this step is referred to as "step (1)"), (2) aging the reduction solid for at least 18 hours in an inert solvent under stirring intermittently to produce a solid product (hereinafter, this step is referred to as "step (2)"), (3) contacting the solid product with an ether compound, titanium tetrachloride and an organic acid halide compound, and then heating a resultant mixture to produce an organic acid halide-treated solid (hereinafter, this step is referred to as "step (3)"), (4) contacting the organic acid halide-treated solid with a mixture of an ether compound, titanium tetrachloride and an ester compound, or with a mixture of an ether compound and titanium tetrachloride, and then heating a resultant mixture to produce a solid catalyst component containing a titanium compound (hereinafter, this step is referred to as "step (4)"), and (5) contacting the solid catalyst component with an aluminum compound and an electron donor compound to produce a catalyst for α-olefin polymerization (hereinafter, this step is referred to as "step (5)"):

$$\text{Ti}(OR^1)_a X_{4-a} \tag{1}$$

wherein $R^1$ is a hydrocarbon group having 1 to 20 carbon atoms; X is a halogen atom; and a is a number satisfying $0 < a \leq 4$.

The present invention also provides a process for producing an α-olefin polymer, which comprises the step of homopolymerizing an α-olefin, or copolymerizing at least one kind of an α-olefin and ethylene in the presence of a catalyst for α-olefin polymerization produced by the above-mentioned process.

DETAILED DESCRIPTION OF THE INVENTION

Examples of $R^1$ in the formula (1) are alkyl groups such asmethyl, ethyl, propyl, isopropyl, butyl, isobutyl, tert-butyl, amyl, isoamyl, tert-amyl, hexyl, heptyl, octyl, decyl and dodecyl groups; aryl groups such as phenyl, cresyl, xylyl and naphthyl groups; allyl groups such as a propenyl group; and aralkyl groups such as a benzyl group. Among them, alkyl groups having 2 to 18 carbon atoms or aryl groups having 6 to 18 carbon atoms are preferable, and straight-chain alkyl groups having 2 to 18 carbon atoms are particularly preferable. As the compound represented by the above formula (1), it is allowed to use those having two or more $OR^1$ groups different from one another.

As X in the formula (1), a chlorine atom, a bromine atom and an iodine atom are exemplified. Of these, a chlorine atom is particularly preferred.

A preferable a in the formula (1) is a number satisfying $2 \leq a \leq 4$, and a particularly preferable a is 4.

The compound represented by the formula (1) can be produced by a process known in the art, such as (1) a process comprising the step of reacting $Ti(OR^1)_4$ with $TiX_4$ in a predetermined ratio, and (2) a process comprising the step of reacting $Tix_4$ with a corresponding alcohol (for example, $R^1OH$) in a predetermined ratio.

Examples of the compound represented by the formula (1) are titanium tetrahalides such as titanium tetrachloride, titanium tetrabromide and titanium tetraiodide; hydrocarbyloxytitanium trihalides such as methoxytitanium trichloride, ethoxytitanium trichloride, butoxytitanium trichloride, phenoxytitanium trichloride and ethoxytitanium tribromlde; dihydrocarbyloxytitanium dihalides such as dimethoxytitanium dichloride, diethoxytitanium dichloride, dibutoxytitanium dichloride, diphenoxytitanium dichloride and diethoxytitanium dibromide; trihydrocarbyloxytitanium monohalides such as trimethoxytitanium chloride, triethoxytitanium chloride, tributoxytitanium chloride, triphenoxytitanium chloride and triethoxytitanium bromide; and tetrahydrocarbyloxytitanium compounds such as tetramethoxytitanium, tetraethoxytitanium, tetrabutoxytitanium and tetraphenoxytitanium.

Examples of the organosilicon compound used in the present invention are compounds represented by the following formulas (2) to (4):

$$Si(OR^2)_m R^3_{4-m} \quad (2)$$

$$R^4(R^5_2 SiO)_p SiR^6_3 \quad (3)$$

$$(R^7_2 SiO)_q \quad (4)$$

wherein $R^2$ is a hydrocarbon group having 1 to 20 carbon atoms; $R^3$, $R^4$, $R^5$, $R^6$ and $R^7$ are independently of one another a hydrocarbon group having 1 to 20 carbon atoms or a hydrogen atom; m is a number satisfying $0<m\leq 4$; p is an integer of from 1 to 1000; and q is an integer of from 2 to 1000.

Examples of the organosilicon compound are tetramethoxysilane, dimethyldimethoxysilane, tetraethoxysilane, triethoxyethylsilane, diethoxydiethylsilane, ethoxytriethylsilane, tetraisopropoxysilane, di-isopropoxy-di-isopropylsilane, tetrapropoxysilane, dipropoxydipropylsilane, tetrabutoxysilane, dibutoxydlbutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldilsiloxane, hexapropyldisiloxane, octaethyltrisiloxane, dimethyl polysiloxane, diphenyl polysiloxane, methylhydro polysiloxane and phenylhydro polysiloxane. Among these, preferable are compounds represented by the formula (2), and among them, compounds wherein m is a number satisfying $1\leq m\leq 4$ are preferable, and tetraalkoxysilane compounds wherein m=4 are particularly preferable.

Examples of the ester compounds used in the present invention are mono-carboxylic acid esters and polycarboxylic acid esters. Examples of said compounds are aliphatic carboxylic acid esters, alicyclic carboxylic acid esters and aromatic carboxylic acid esters.

Examples of the ester compounds are methyl acetate, ethyl acetate, phenyl acetate, methyl propionate, ethyl propionate. ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl sucCinate, diethylmalonate, dibutylmalonate, dimethylmaleate, dibutyl maleate, diethyl itaconate, dibutyl itaconate, monoethyl phthalate, dimethyl phthalate, methyl ethyl phthalate, diethyl phthalate, di-n-propyl phthalate, di-isopropyl phthalate, di-n-butyl phthalate, di-isobutyl phthalate, di-n-octyl phthalate and diphenyl phthalate. Among them, unsaturated aliphatic carboxylic acid esters such as methacrylic acid esters and maleic acid esters and phthalic acid esters are preferable, and diesters of phthalic acid are particularly preferalbe.

The "organomagnesium compound" used in the present invention means any types of organomagnesium compounds having a Mg-carbon bond. As said compound, preferable is (i) a Grignard compound represented by the following formula (5), or (ii) a dialkylmagnesium compound or a diarylmagnesium compound represented by the following formula (6):

$$R^8 MgX \quad (5)$$

$$R^9 R^{10} Mg \quad (6)$$

wherein $R^8$ is a hydrocarbon group having 1 to 20 carbon atoms; X is a halogen atom; and $R^9$ and $R^{10}$ are independently of each other a hydrocarbon group, having 1 to 20 carbon atoms, which may be the same or different from each other.

Examples of $R^8$, $R^9$ and $R^{10}$ in the above formulas are alkyl, aryl, aralkyl and alkenyl groups having 1 to 20 carbon atoms such as methyl, ethyl, propyl, isopropyl, butyl, sec-butyl, amyl, isoamyl, hexyl, octyl, 2-ethylhexyl, phenyl and benzyl groups.

Examples of compounds represented by the formula (5) are methylmagnesium chloride, ethylmagnesium chloride, ethylmagnesium bromide, ethylmagnesium iodide, propylmagnesium chloride, propylmagnesium bromide, butylmagriesiumchloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride hexylmagnesium chloride, phenylmagnesium chloride and phenylmagnesium bromide.

Examples of compounds represented by the formula (6) are dimethylmagnesium, diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, dlhexylmagnesium, diphenylmagnesium and butylethylmagnesium.

Examples of solvents for producing the organomagnesium compound are an ether solvent such as diethyl ether, dipropyl ether, diisopropyl ether, dibutyl ether, diisobutyl ether, diamyl ether, dilsoamyl ether, dihexyl ether, dioctyl ether, diphenyl ether, dibenzyl ether, phenetol, anisole, tetrahydrofuran and tetrahydropyrane; a hydrocarbon solvent such as hexane, octane, cyclohexane, methylcyclohexane, benzene, toluene and xylene; and a mixed solvent comprising two or more thereof.

It is preferable to use an ether solution of the organomagnesium compound. Examples of the ether are an ether having at least six carbon atoms in its molecule, and an ether having a cyclic structure. Among them, an ether solution of the compound represented by the formula (5) is palrticularly preferable from a viewpoint of performances of a polymerization catalyst obtained. It is permitted to use the organomagnesium compound in combination with an orgenometallic compound to form a hydrocarbon soluble complex. Examples of the organometallic compounds are compounds of Li, Be, B. Al and Zn.

Examples of an ether compound used in the present invention are dialky ethers such as diethyl ether, dipropyl ether, diisopropyl ether, dibutyl ether, diisobutyl ether, diamyl ether, diisoamyl ether, dineopentyl ether, dihexyl ether, dioctylether, methyl butyl ether, methyl isoamyl ether and ethyl Jsobutyl ether. Among them, diisobutyl ether or diisoalmyl ether is particularly preferable.

Examples of an organic acid halide used in the present invention are mono-carboxylic acid halides and poly-carboxylic acid halides. Specific examples of those compounds are aliphatic carboxylic acid halides, alicyclic carboxylic acid halides and aromatic carboxylic acid halides.

Examples of the organic acid halide compound are acetyl chloride, propionic chloride, butyric chloride, valeric chloride, acrylic chloride, methacrylic chloride, benzoic chloride, toluic chloride, anisic chloride, succinic chloride, malonic chloride, maleic chloride, itaconic chloride and phthalic chloride. Of these, aromatic carboxylic acid chlorides such as benzoic chloride, toluic chloride and phthalic chloride are preferable, and phthalic chloride is particularly preferable.

All of the steps (1) to (5) are carried out in an atmosphere of an inert gas such as argon.

Examples of a method for carrying out the reduction reaction in the step (1) are (i) a method of adding the organomagnesium compound into a mixture containing the organosilicon compound and the titanium compound, and (ii) a method of adding a mixture containing the organosilicon compound and the titanium compound into a solution containing the organomagnesium compound. Among them, the method (1) is preferable from a viewpoint of performances of a polymerization catalyst obtained.

It is preferable to use the titanium compound and the organosilicon compound dissolved in or diluted with a suitable solvent. Examples of the solvent are aliphatic hydrocarbons such as hexane, heptane, octane and decane; aromatic hydrocarbons such as toluene andxylene: alicyclichydrocarbons such as cyclohexane, methylcyclohexane and decalin; and ether compounds such as diethyl ether, dibutyl ether, diusoamyl ether and tetrahydrofuran.

A temperature in the reduction reaction is usually from $-50$ to $70°$ C., preferably from $-30$ to $50°$ C., and particularly preferably from $-25$ to $35°$ C. When the temperature is too high, an activity of an obtained polymerization catalyst is low.

It is possible to impregnate a porous material with the solid product by carrying out the reduction reaction in the presence of the porous material such as an inorganic oxide and an organic polymer. Preferable porous materials are those, whIch have (1) a volume of micro pores having a radius of from 20 to 200 nm of 0.3 ml/g or more, and (2) an average particle diameter of from 5 to 300 $\mu$m.

Examples of the inorganic porous material are $SiO_2$, $Al_2O_3$, $MgO$, $TiO_2$, $ZrO_2$, $SiO_2 \cdot Al_2O_3$ complex oxide, $MgO \cdot Al_2O_3$ complex oxide and $MgO \cdot SiO_2 \cdot Al_2O_3$ complex oxide. Examples of the organic porous material are a polystyrene-based polymer, a polyacrylate-based polymer, a polyacrylonitrile-based polymer, a polyvinyl chloride-based polymer and apolyolefin-based polymer. Specific examples thereof are polystyrene, a styrene-divinylbenzene copolymer, a styrene-n,n'-alkylenedlmethacrylamide copolymer, a styrene-ethylene glycol-methyl dimethacrylate copolymer, polyethylacrylate, armethyl acrylate-divinylbenzene copolymer, an ethyl acrylate-divinylbenzene copolymer, polymethylmethacrylate, a methyl methacrylate-divinylbenzene copolymer, a polyethylene glycol-methyl dimethacrylate copolymer, polyacrylonitrile, an acrylonitrile-divinylbenzene copolymer, polyvinyl chloride, polyvinyl pyrrolidine, polyvinyl pyridine, an ethylvinyl benzene-divinylbenzene copolymer, polyethylene, an ethylene-methyl acrylate copolymer and polypropylene. Among them, preferable is $SiO_2$, $Al_2O_3$ or a styrene-divinylbenzene copolymer.

A total adding time required in the above-mentioned methods (i) and (ii) regarding the reduction reaction in the step (1) is not limited, and is usually from about 30 minutes to about 12 hours. In order to complete the reduction reaction, an additional reaction may be carried out at 0 to $120°$ C. after said adding.

The organosilicon compound is used in an amount of usually from 1 to 50, preferably from 3 to 30, and particularly preferably from 5 to 25 in terms of an atomic ratio Si/Ti, i.e. a ratio of a silicon atom in the organosilicon compound to a titanium atom in the titanium compound.

The organomagnesium compound is used in an amount of usually from 0.1 to 10, preferably from 0.2 to 5.0, and particularly preferably from 0.5 to 2.0 in terms of an atomic ratio (Ti+Si)/Mg, i.e. a ratio of the sum of a titanium atom in the titanium compound and a silicon atom in the organosilicon compound to a magnesium atom in the organomagnesium compound.

The reduction solid obtained by solid-liquid separation of the reaction mixture obtained in the step (1) is usually washed several times with an inert solvent such as hexane, heptane and toluene. Said reduction solid contains a trivalent titanium atom, magnesium and a hydrocarbyloxy group, and generally has an amorphous structure or extremely low crystallinity. A reduction solidhaving an amorphous structure is preferable from a viewpoint of performances of a catalyst obtained.

The solid product is produced by carrying out the step (2) using said reduction solid. Examples of an Inert solvent used in said step are inert hydrocarbon solvents such as hexane, heptane and toluene. An aging temperature is usually from $-50$ to $70°$ C., preferably from $-30$ to $50°$ C., and particularly preferably from $-25$ to $35°$ C. An aging time is usually 18 hours or more, and preferably 30 hours or more.

As a contacting order in the step (3), there is exemplified an order of contacting the solid product with a mixture of the ether compound and titanium tetrachloride, and then contacting with the organic acid halide compound. By contacting with the organic acid halide compound, there can be produced a polymerization catalyst, which can accomplish an object of the present invention.

The ether compound in the step (3) is used in an amount of usually from 0.1 to 100 mol, preferably from 0.5 to 50 mol, and particularly preferably from 1 to 20 mol per one mol of a titanium atom contained in the solid product.

Titanium tetrachloride in the step (3) is added in an amount of usually from 1 to 1000 mol, preferably from 3 to 500 mol, and. particularly preferably from 10 to 300 mol per one mol of a titanium atom contained in the solid product; and usually from 1 to 100 mol, preferably from 1.5 to 75 mol, and particularly preferably from 2 to 50 mol per one mol of the ether compound.

The organic acid halide compound is used in an amount of usually from 0.1 to 50 mol, more preferably from 0.3 to 20 mol, and particularly preferably from 0.5 to 10 mol per one mol of a titanium atom contained in the solid product; and usually from 0.01 to 1.0 mol, and preferably from 0.03 to 0.5 mol per one mol of a magnesium atom contained in the solid product. When said amount exceeds 50 mol in the former, or exceeds 1.0 mol in the latter, destruction of the solid product may occur.

A contacting method in the step (3) is not limited. As said method, there can be exemplified methods known in the art such as a slurry method and a mechanically pulverizing method using a ball mill. Among them, a slurry method, wherein contacting is carried out in the presence of a diluent, is preferable.

Examples of said diluent are aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene. Among them, particularly preferable is an aromatic hydrocarbon or a halogenated hydrocarbon. The diluent is used in an amount of usually from 0.1 to 1000 ml, and preferably from 1 to 100 ml per one g of the solid product.

An example of an embodiment of the step (3) is an embodiment comprising the steps of (1) adding the diluent and a mixture of the ether compound and titanium tetrachloride to the solid product at 85° C. or lower, and preferably 75° C. or lower, to obtain a solid product slurry, (ii) heating the solid product slurry at usually from −50 to 150° C., and preferably from 0 to 120° C., for usually 30 minutes or longer, and preferably from 1 to 10 hours, and (iii) solid-liquid separating after allowing to stand, and washing the obtained solid several times with an inert hydrocarbon solvent to obtain the organic acid halide-treated solid.

The step (4) is preferably carried out in a slurry state. Examples of a solvent for the slurry are aliphatic hydrocarbons such as pentane, hexane, heptane, octane and decane; aromatic hydrocarbons such as toluene and xylene; alicyclic hydrocarbons such as cyclohexane, methylcyclohexane and decalin; and halogenated hydrocarbons such as dichloroethene, trichloroethene, monochlorobenzene, dichlorobenzene and trichlorobenzene. Among them, preferable is a halogenated hydrocarbon or an aromatic hydrocarbon.

A concentration of said slurry is generally form 0.05 to 0.7 g-solid/ml-solvent, and particularly preferably from 0.1 to 0.5 g-solid/ml-solvent. A contacting temperature in the step (4) is generally form 30 to 150° C., preferably from 45 to 135° C., and particularly preferably from 60 to 120° C. A contacting time is not particularly limited, and generally preferably form 30 minutes to 6 hours.

Examples of a contacting method in the step (4) are (i) a method wherein the ether compound, titanium tetrachloride and optionally the ester compound are added to the organic acid halide-treated solid obtained in the step (3), and (ii) a method wherein the organic acid halide-treated solid is added to a solution containing the ether compound, titanium tetrachloride and optionally the ester compound. Among the method (i), preferable is (a) a method wherein the ether compound and optionally the ester compound are added to the organic acid halide-treated solid, and then titanium tetrachloride is added, or (b) a method wherein the ether compound, titanium tetrachloride and optionally the ester compound are added simultaneously to the organic acid halide-treated solid. Particularly preferable is a method wherein a mixture containing the ether compound, titanium tetrachloride and optionally the ester compound is added to the organic acid halide-treated solid.

A contacting number of times in the step (4) is one time or more. Preferable is two times or more from a viewpoint of an activity of a polymerization catalyst obtained and stereoregularity of a polymer obtained.

The ether compound in the step (4) is used in an amount of usually from 0.1 to 100 mol, preferably from 0.5 to 50 mol, and particularly preferably from 1 to 20 mol per one mol of a titanium atom contained in the solid product obtained in the step (2). Titanium tetrachloride is added in an amount of usually from 1 to 1000 mol, preferably from 3 to 500 mol, and particularly preferably from 10 to 300 mol per one mol of a titanium atom contained in the solid product obtained in the step (2);: and in an amount of usually from 1 to 100 mol, preferably from 1.5 to 75 mol, and particularly preferably from 2 to 50 mol per one mol of the ether compound.

When using the ester compound in the step (4), the ester compound is used in an amount of not more than 30 mol, preferably not more than 15 mol, and particularly preferably not more than 5 mol per one mol of a titanium atom contained in the solid product obtained in the step (2).

The steps (3) and (4) are preferably carried out in a closed reaction vessel. Pressure in the reaction vessel rises gradually from an ambient pressure to about 300 KpaG with a lapse of a contacting time due to generation of vapor of materials added to the reaction vessel, an organic solvent and gaseous reaction by-products. However, it is preferable not to purge any gas out of the reaction vessel.

The solid catalyst component used In the step (5) is generally obtained by washing a solid several times, which solid is obtained by solid-liquid separating the reaction mixture obtained in the step (4), with an inert hydrocarbon solvent such as hexane and heptane. Preferably, said solid is washed at from 50 to 120° C. at least one time with lots of a halogenated hydrocarbon solvent such as monochlorobenzene or an aromatic hydrocarbon solvent such as toluene, and is further washed several times with an aliphatic hydrocarbon solvent such au hexane, from a viewpoint of an activity of a polymerization catalyst obtained and stereoregularity of a polymer obtained.

The organoaluminum compound used in the step (5) means a compound having at least one Al-carbon bond in the molecule. Typical examples thereof are those represented by the following formulas (7) and (8):

$$R^{11}_r AlY_{3-r} \tag{7}$$

$$R^{12}R^{13}Al\text{—}O\text{—}AlR^{14}R^{15} \tag{8}$$

wherein $R^{11}$ to $R^{12}$ are independently of one another a hydrocarbon group having 1 to 20 carbon atoms; Y is a halogen atom, a hydrogen atom or an alkoxy group; and r is a number satisfying $2 \leq r \leq 3$.

Examples of said organoaluminum compound are trialkylaluminums such as triethylaluminum, tri-isobutylaluminum and trihexylaluminum; dialkylaluminum hydrides suchas diethylaluminumhydrideanddi-isobutylaluminum hydride; dialkylaluminum halides such as diethylaluminum chloride; mixtures of trialkylaluminums and dialkylaluminum halides such as a mixture of triethylaluminum and diethylaluminum chloride; and alkylalumoxanes such as tetraethyldialumoxane and tetrabutyldialumoxane. Among these, trialkylaluminums, mixtures of trialkylaluminums and dialkylaluminum halides, or alkylalumoxanes are preferable, and triethylaluminum, tri-isobutylaluminum, a mixture of triethylaluminum and diethylaluminum chloride, or tetraethyldialumoxane are particularly preferable.

The organoaluminun compound is used in an amount of usually from 0.5 to 1000 mol, and particularly preferably from 1 to 600 mol per one mol of the titanium atom contained in the solid catalyst component.

Examples of the electron donor compound used in the step (5) are oxygen-containing electron donor compounds such as alcohols, phenols, ketones, aldehydes, carboxylic acids, organic acid esters, inorganic acid esters, ethers, acid amides and acid anhydrides; and nitrogen-containing electron donor compounds such as ammonia, amines, nitrites and isocyanates. Of these, inorganic acid esters or ethers are preferable.

As the above-mentioned inorganic acid esters, preferable are silicon compounds represented by the following formula (9):

$$R^{16}_n Si(OR^{17})_{4-n} \tag{9}$$

wherein $R^{16}$ is a hydrocarbon group having 1 to 20 carbon atoms or a hydrogen atom; $R^{17}$ is a hydrocarbon atoms having 1 to 20 carbon atoms; each of $R^{16}$ and $R^{17}$ may have different substituent (s) in the same molecule; and n is a number satisfying $0 \leq n < 4$.

Examples of said silicon compounds are tetramethoxysilane, tetraethoxysilane, tetrabutoxysilane, tetraphenoxysilane, methyltrimethoxysilane, ethyltrimethoxysilane, butyltriethoxysilane, isobutyltrimethoxysilane, tert-butyltrimethoxyailane, isopropyltrimethoxysilane, cyclohexyltrimethoxysilane, phenyltrimethoxysilane, vinyltrimethoxysilane, dimethyldimethoxysilane, diethyldimethoxysilane, dipropyldi-methoxysilane, propylmethyldimethoxysilane, diisopropyldimethoxysilane, dibutyldimethoxysilane, diisobutyldimethoxysilane, di-tert-butyldimethoxysilane, butylmethyldimethoxysilane, butylethyldimethoxysilane, tert-butylmethyldimethoxysilane, isobutylisopropyldimethoxysilane, tert-butylisopropyldimethoxysilane, hexylmethyldnmethoxysilane, hexylethyldimethoxysilane, dodecymethyldimethoxysilane, dicyclopentyldimethoxysilane, cyclopentylmethyldimethoxysilane, cyclopentylethyldimethoxysilane, cyclopentylisopropyldimethoxysilane, cyalopentylisobutyldimithoxysilane, cyclopentyi-tert-butyldlmethoxysilane, dicyclohexyldimethoxysilane, cyclohexylmethyldimethoxysilane, cyclohexylethyldimethoxysilane, cyclohexylisopropyldirmethoxysilane, cyclohaxylisobutyldlmethoxysilane, cyclohexyl-tert-butyldimethoxysilane, cyclohexylcyclopentyldimethoxysilane, cyclohexylphenyldimethoxysilane, dlphenyldimethoxysilane, phenylmethyld:lmethoxysilane, phenylisopropyldimethoxysilane, phenylisobutyldimethoxysilane, phenyl-tert-butyldimethoxysilane, phenylcyclopentyldimethoxysilane, vinylmethyldlmethoxysilane, methyltriethoxysilane, ethyltriethoxysilane, butyltriethoxysilane, isobutyltriethoxysilane, tert-butyltriethoxysllane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, dilsobutyldiethoxysilane, di-tert-butyldiethoxysilane, butylmethyldiethoxysilane, butylethyldiethoxysilane, tert-butylmethyldiethoxysiane, hexylmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyl-tri-tert-butoxysilane, 2-norbornanetrimethoxysilane, 2-norbornanetriethoxysilane, 2-norbornanemethyldimethoxysilane, trimethylphenoxysilane and methyltriallyloxysilane.

Preferable examples of the above-mentioned ethers are a dialkylether and a diether compound represented by the following formula (10):

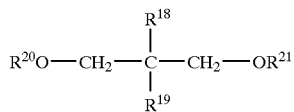

wherein $R^{18}$ to $R^{21}$ are independently of one another a straight-or branched-chain alkyl group, an alicyclic group, an aryl group or an aralky group having 1 to 20 carbon atoms, and $R^{18}$ or $R^{19}$ may be independently of each other a hydrogen atom.

Examples of the ethers are diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, ethyl isobutyl ether, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-dilsopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane and 2-heptyl-2-pentyl-1,3-dimethoxypropane.

As the electron donor compound, particularly preferable is an organosilicon compound represented by the following formula (10):

$$R^{22}R^{23}Si(OR^{24})_2 \qquad (10).$$

In the formula (10). $R^{22}$ is a $C_{3-20}$ hydrocarbon group, wherein a carbon atom adjacent to Si is secondary or tertiary. Examples of $R^{27}$ are branched-chain alkyl groups such as an isopropyl group, a sec-butyl group, a tert-butyl group and a tert-amyl group; cycloalkyl groups such as a cyclopentyl group and a cyclohexyl group: cycloalkenyl groups such as a cyclopentenyl group; and aryl groups such as a phenyl group and a tolyl group.

In the formula (10), $R^{23}$ is a $C_{1-20}$ hydrocarbon group. Examples of $R^{23}$ are straight-chain alkyl groups such as a methyl group, an ethyl group, a propyl group, a butyl group and a pentyl group; branched-chain alkyl groups such as an isopropyl group, a sec-butyl group, a tert-butyl group and a tert-amyl group; cycloalkyl groups such as a cyclopentyl group and a cyclohexyl group; cycloalkenyl groups such as a cyclopentenyl group; and aryl groups such as a phenyl group and a tolyl group.

In the formula (10), $R^{24}$ is a $C_{1-20}$, and preferably $C_{1-5}$ hydrocarbon group.

Examples of said organosilicon compound are diisopropyldimethoxysilane, diisobutyldinethoxysilane, di-tert-butyldimethoxysilane, tert-butylmethyldimethoxysilane, tert-butylethyldimethoxysilane, tart-butyl-n-ptropyldimethoxysilane, tert-butyl-n-butyldirmethoxysilane, tert-amylmethyldimethoxysilane, tert-amylethyldimethoxysilane, tert-amyl-n-propyldimethoxysilane, tsrt-amyl-n-butyldimethoxysilane, isobutylisopropyldimethoxysilane, tert-butylisopropyldinethoxysilane, dicyclopentyldimethoxysilane, cyclopentylisopropyldimethoxysilane. cyclopentylisobutyldimethoxysilane, cyclopentyl-tert-butyldimethoxysilane, dicyclohexyldimethoxysllane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphanyldimethoxysilane, diphenyldrmethoxysllane, phenymethyldimethoxysilane, phenylisopropyldimethoxygilane, phenylisobutyldimethoxysilane, phenyl-tert-butyldinethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cycohexylmethyldiethoxysilane, cyclohexylethyldiethoxysilane, diphenyldiethoxysilane, phenylmethyldiethoxysilane and 2-norbornanemethyldiethoxysilane.

The α-olefin used in the present invention is that having not less than 3 carbon atoms, and preferably from 3 to 10 carbon atoms. Examples of the α-olefin are straight chain monolefins such as propylene, butene-1, pentene-1, hexene-1, heptene-1, octene-1 and decene-1; branched chain monolefins such as 3-methylbutene-1, 3-methylpentene-1 and 4-methylpenetene-1; vinylcyclohexane; and a combination of two or more thereof. Of these, preferableishomopolymerizationof propyleneorbutene-1, or copolymerization of a mixture of olefins containing propylene or butene-1 as a main component; and particularly preferable is homopolymerization of propylene, or copolymerization of amixture of olefins containing propylene as a main component.

In the copolymerization, it is permitted to copolymerize at least two kinds of α-olefins with ethylene. Further, it is permitted to copolymerize a compound having several unsaturated bonds such as a conjugated diene and a nonconjugated diene. A copolymerization method may be a hetero-block copolymerization method, wherein polymerization is carried out in two or more stages.

Tn the step (5) and in the process for producing an α-olefin polymer in accordance with the present invention, amethod for supplying catalyst components such as the solid catalyst component, the organoaluminum compound and the electron donor compound into apolymerizationvessel is not particularlylimited. Preferable is a method, wherein supplying is carried out in an inert gas such as nitrogen and argon under water free conditions. Specific examples of the method are (1) a method wherein the above-mentioned components are separately supplied to a polymerization vessel, and (2) amethod wherein any two components of the above-mentioned components are pre-mixed, and then the resultant pre-mixture and the remaining component are supplied to a polymerization vessel.

In the process for producing an α-olefin polymer in accordance with the present invention, the above-mentioned catalyst itself may be used (such a polymerization is hereinafter referred to as "real polymerization"), or a pre-polymerized catalyst obtained by pre-polymerizing said polymerization catalyst as follows may be used.

The pre-polymerized catalyst can be generally produced by polymerizing (pre-polymerizing) a few amount of an olefin in the presence of the solid catalyst component and the organoaluminum compound. A preferable pre-polymerlzation method is a slurry polymerization method, wherein an inert hydrocarbon such as propane, butane, isobutane pentane, isopentane, hexane, heptane, octane, cyclohexane, benzene and toluene is used as a solvent. It is allowed to use an olefin in place of a part or total of said solvent.

In the pre-polymerization, the organoaluminum compound is used in an amount of usually from 0.5 to 700 mol, preferably from 0.8 to 500 mol, and particularly preferably from 1 to 200 mol per one mol of the titanium atom contained in the solid catalyst component.

An amount of the olefin pre-polymerized is usually from 0.01 to 1000 g, preferably from 0.05 to 500 g, and particularly preferably from 0.1 to 200 g per one g of the solid catalyst component.

A concentration of the slurry in the above-mentioned slurry polymerization is preferably from 1 to 500 g-solid catalyst component/liter-solvent, and particularly preferably from 3 to 300 g-solid catalyst component/llter-solvent. A pre-polymerization temperature is preferably from −20 to 100° C., and particularly preferably from 0 to 80° C. A partial pressure of the olefin in the gas phase portion in the pre-polymerization is preferably from 0.01 to 20 kg/cm$^2$, and particularly preferably from 0.1 to 10 kg/cm$^2$, but the olefin which is liquid at the pre-polymerization pressure and temperature is not limited thereto. A pre-polymerization time is not particularly limited, and it is usually preferably from 2 minutes to 15 hours.

In the pre-polymerization, examples of a method for supplying the solid catalyst component, the organoaluminum compound and the olefin are (1) amethodwherein the solid catalyst component and the organoaluminum compound are supplied, and thereafter the olefin is supplied, and (2) a method wherein the solid catalyst component and the olefin are supplied, and thereafter the organoaluminum compound is supplied. Examples of a method for supplying the olefin are (1) a method wherein the olefin Is supplied one after another, while keeping a pressure in a polymerization vessel at a predetermined level, and (2) a method wherein the total amount of the olefin predetermined is supplied at a time. It is permitted to use a chain transfer agent such as hydrogen in order to regulate a molecular weight of an olefin polymer obtained in the pre-polymerization.

In the pre-polymerization, if necessary, a part or the total amount of the above-mentioned electron donor compound may be used. In the pre-polymerization, the electron donor compound is used in an amount of usually from 0.01 to 400 mol, preferably from 0.02 to 200 mol, and particularly preferably from 0.03 to 100 mol per one mol of the titanium atom contained in the solid catalyst component; and usually from 0.003 to 5 mol, preferably from 0.005 to 3 mol, and particularly preferably from 0.01 to 2 mol per one mol of the organoaluminum compound.

In the pre-polymerization, a method for supplying the electron donor compound to a polymerization vessel is not particularly limited. Examples of the method are (1) a method wherein only said compound is supplied, and (2) a method wherein a contact product of said compound with the organoaluminum compound is supplied. The olefin used in the pre-polymerization may be the same as or different from that used in the real polymerization.

Examples of amethod for real-polymerizing are (1) amethod wherein the olefin is polymerized in the presence of a catalyst obtained by contacting the solid catalyst component, the organoaluminum compound and the electron donor compound, (2) a method wherein the olefin is polymerized in the presence of the pre-polymerized catalyst, and (3) a method wherein the olefin is polymerized in the presence of a contact product obtained by contacting said pre-polymerized catalyst, the organoaluminum compound and the electron donor compound.

In the real polymerization, the organoaluminum compound is used in an amount of usually from 1 to 1000 mol, and particularly preferably from 5 to 600 mol per one mol of the titanium atom contained in the solid catalyst component.

In the real polymerization, the electron donor compound is used in an amount of usually from 0.1 to 2000 mol, preferably from 0.3 to 1000 mol, and particularly preferably from 0.5 to 800 mol per one mol of the titanium atom contained in the solid catalyst component; and usually from 0.001 to 5 mol, preferably from 0.005 to 3 mol, and particularly preferably from 0.01 to 1 mole per one mol of the organoaluminum compound.

A temperature of the real polymerization is usually from −30 to 300° C., and preferably from 20 to 180° C. A polymerization pressure is not particularly limited, and from an industrial and economical point of view, it is usually from atmospheric pressure to 100 kg/cm$^2$, and preferably from about 2 to 50 kg/cm$^2$. The polymerization may be carried out in either a batch-wise manner or a continuous manner. Examples of a polymerization method are a slurry or solution polymerization method, wherein an inert hydrocarbon solvent such as propane, butane, lsobutane, pentane, hexane, heptane and octane is used; a bulk polymerization method, wherein an olefin which is liquid at the polymerization temperature is used as a medium; and a gas phase polymerization method.

In the real polymerization,iit is permitted to use a chain transfer agent such as hydrogen in order to regulate a molecular weight of an olefin polymer obtained.

EXAMPLE

The present invention is explained in more detail with reference to the following Examples, which are only illustrative and not intended to limit the scope of the present invention.

Physical properties of polymers were measured by the following methods.

1. 20° C. Xylene-Soluble Portion (CXS value (% by weight))

20° C. xylene-soluble portion was measured according to a method comprising the steps of:

(1) dissolving 1 g of a powdery polymer in 200 ml of boiled xylene to obtain a solution, (2) cooling gradually the solution to 50° C., (3) immersing the cooled solution in ice water under stirring, whereby the solution is further cooled to 20° C., (4) continuing the cooling at 20° C. for 3 hours to precipitate a polymer, (5) separating the precipitated polymer by filtration to obtain a filtrate, (6) evaporating xylene contained in the filtrate to obtain a solid, which is then dried at 60° C. under a reduced pressure, and weighing the obtained dried solid (W g), and (7) calculating CXS value (% by weight) by the formula of "100 X W".

The smaller a CXS value of a polymer is , the smaller a content of an amorphous polymer contained in the polymer is, and the higher stereospecificity of the polymer is.

2. Bulk Density (g/ml)

Bulk density of a powdery polymer was measured according to JIS K-6721 using a bulk density measuring apparatus manufactured by Tsutsui Rikagakukiki Co., Ltd.

Example 1

1. Production of Solid Product (1) A reduction vessel (inner volume=187 liters) equipped with a stirrer, a dropping apparatus and a jacket was purged enough with nitrogen, and thereafter 80 liters of hexane, 2.43 kg (7.14 mol) of tetrabutoxytitanium and 20.6 kg (98.9 mol) of tetraethoxysilane were fed into said vessel and stirred to obtain a homogeneous solution. While keeping inner temperature of said vessel at 17° C., 4.23 kg of a di-n-butyl ether solution of n-butylmagnesium chloride (manufactured by Yuki Gosei Yakuhin Co., Ltd., n-butylmagneslum chloride concentration=2.1 mmol/ml) was added gradually dropwise from the dropping apparatus under stirring over 5 hours. After completion of the addition, the mixture was additionally stirred for 1 hour under keeping inner temperature of said vessel at 17° C., then heated to 20° C., and additionally stirred for 1 hour, (2) Thereafter, a filtration-washing vessel (inner volume= 420 liters) equipped with a sintered-metal filter was purged with nitrogen, and then the slurry contained in the above-mentioned reduction vessel was transferred to the filtration-washing vessel by means of nitrogen gas pressure (hereinafter referred to as "pressure-transfer"). The slurry was filtered for solid-liquid separation, and the separated solid was washed and filtered three times with each 70 liters of toluene.

(3) Thereafter, the washed solid was converted to a toluene slurry, and said slurry was pressure-transferred from the filtration-washing vessel to an activation vessel, which vessel was different froM the above-mentioned reduction vessel, and was equipped with a stirrer and a jacket. An additional appropriate amount of toluene was added to the slurry to obtain a slurryhaving a slurry concentration of 0.40 g-solid/ml-solvent (hereinafter, the slurry concentration is simply referred to as "g/ml"). The slurry was aged to obtain a solid product, wherein the "aged, namely, aging" means an intermittent 10 minutes-stirring of the slurry every 8 hours for 30 hours at 10° C., which is said slurry's temperature regulated by a coolant in the jacket. An amount of the solid product resulted from the slurry was 15 kg, and as a result of a composition analysis, it was found to contain 2.0% by weight of the titanium atom, 36.5% by weight of the ethoxy group and 4.0% by weight of the butoxy group.

(2) Production of Solid Catalyst Component (1) The obtained solid product slurry contained in the activation vessel, a mixed liquid containing 1.16 kg of dibutyl ether and 51.8 kg of titanium tetrachloride was fed under stirring, and then 4.23 kg of phthalic chloride was fed thereto.

During said feeding, temperature of the solid product slurrywas kept at 75° C. or lower. After completion of said feeding, the activation vessel was heated to 110° C., and a reaction was carried out for 3 hours at said temperature. During said reaction, any gas contained in the activation vessel was not purged out of the activation vessel. Pressure in the activation vessel was raised gradually to about 300 KpaG with proceeding of the reaction. A slurry resulted from the reaction containing an organic acid hallde-treated solid was pressure-transferred to the filtration-washing vessel. The slurry was filtered for solid-liquid separation, and the separated solid was washed and filtered three times with each 70 liters of toluene. The washed solid was converted to a toluene slurry, and said slurry was pressure-transferred again from the filtration-washing vessel to the activation vessel. An additional appropriate amount of toluene was added to the slurry to obtain a slurry having a slurry concentration of 0.40 g-solid/ml-solvent.

(2) Thereafter, a mixed liquid containing 1.16 kg of dibutyl ether, 0.87 kg of phthalic dichloride and 20.7 kg of titanium tetrachloride was fed under stirring to the activation vessel, and the activation vessel was heated to 110° C. At said temperature, a reaction was carried out for one hour in a similar manner to that mentioned in the above (1). After that, an operation of filtering and washing similar to that mentioned in the above (1) was repeated two times. The washed solid was converted to a toluene slurry, and said slurry was pressure-transferred from the filtration-washing vessel to the activation vessel. An additional appropriate amount of toluene was added to the slurry to obtain a slurry having a slurry concentration of 0.40 g-solid/ml-solvent.

(3) Thereafter, a mixed liquid containing 1.16 kg of dibutyl ether and 20.7 kg of titanium tetrachloride was fed under stirring to the activation vessel, and the activation vessel was heated to 110° C. At said temperature, a reaction was carried out for one hour in a similar manner to that mentioned in the above (1). After that, an operation of filtering and washing similar to that mentioned in the above (1) was repeated two times. The washed solid was converted to a toluene slurry, and said slurry was pressure-transferred from the filtration-washing vessel to the activation vessel. An additional appropriate amount of toluene was added to the slurry to obtain a slurry having a slurry concentration of 0.40 g-solid/ml-solvent, (4) Thereafter, a mixed liquid containing 1.16 kg of dibutyl ether and 20.7 kg of titanium tetrachloride was fed under stirring to the activation vessel, and the activation vessel was heated to 110° C. At said temperature, a reaction was carried out for one hour in a similar manner to that mentioned in the above (1). After that, an operation of filtering and washing similar to that mentioned in the above (1) was repeated three times, and an operation of filtering and washing was repeated three times using each 70 liters of hexane.

(5) The solid catalyst component obtained by the above-mentioned activation reaction treatment was converted to a toluene slurry, and then the obtained slurry was pressure-transferred to a powder dryer, wherein nitrogen gas heated to 70° C. and having a dew-point of −68 was passed through, in order to evaporate an organic solvent part and dry the solid catalyst component, thereby obtaining 13.5 kg of the solid catalyst component. The dried solid catalyst component was found to contain 2.0% by weight of the titanium atom, 0.1% by weight of the ethoxy group, 0.3% by weight of the butoxy group and 8.8% by weight of the phthalic acid ester.

3. Polymerization of Propylene

A 3 liter stirring type stainless steel made autoclave was purged with argon, and 2.6 mmol of triethylaluminum, 0.26 mmol of cyclohexylethyldimethoxysilane and 5.7 mg of the above-mentioned solid catalyst component were fed in the autoclave, and then hydrogen in an amount corresponding to a partial pressure of 0.33 kg/cm$^2$ was introduced therein. Successively, 780 g of liquefied propylene was fed therein and a temperature of the autoclave was raised to 80° C. Polymerization was carried out at 80° C. for 1 hour. An amount of the obtained powdery polypropylene was 274 g. A yield of polypropylene per one gram of the solid catalyst component (hereinafter, referred to as "PP/Cat") was 48,100 (g/g), and the obtained powdery polypropylene was found to have 0.44% by weight of a CXS value and 0.46 g/ml of a bulk density. Polymerization results are shown in Table 1.

Example 2

1. Production of Solid Product

Example 1 was repeated except that the aging time of the solid product was changed to 60 hours, thereby obtaining 15 kg of the solid product. As a result of a composition analysis, said solid product was found to contain 2.1% by weight of the titanium atom, 36.9% by weight of the ethoxy group and 3.1% by weight of the butoxy group.

2. Production of Solid Catalyst Component

Example 1 was repeated similarly, thereby obtaining 13.5 kg of the solid catalyst component. Said solid catalyst component was found to contain 1.9% by weight of the titanium atom, 0.1% by weight of the ethoxy group, 0.2% by weight of the butoxy group and 10.3% by weight of the phthalic acid ester.

3. Polymerization of Propylene

Example 1 was repeated similarly, thereby obtaining polypropylene, which had 47,500 (g/g) of PP/Cat, 0.40% by weight of a CXS value and 0.47 g/ml of a bulk density. Polymerization results are shown in Table 1.

Example 3

1. Production of Solid Product

Example 1 was repeated except that the aging time of the solid product was changed to 18 hours, thereby obtaining 15 kg of the solid product. Said solid product was found to contain 2.0% by weight of the titanium atom, 39.2% by weight of the ethoxy group and 3.3% by weight of the butoxy group.

2. Production of Solid Catalyst Component

Example 1 was repeated similarly, thereby obtaining 13.5 kg of the solid catalyst component. Said solid catalyst component was found to contain 2.0% by weight of the titanium atom, 0.1% by weight of the ethoxy group, 0.3% by weight of the butoxy group and 10.0% by weight of the phthalic acid ester.

3. Polymerization of Propylene

Example 1 was repeated similarly, thereby obtaining polypropylene, which had 41,000 (g/g) of PP/Cat, 0.50% by weight of a CXS value and 0.47 g/ml of a bulk density. Polymerization results are shown in Table 1.

Comparative Example 1

1. Production of Solid Product

Example 1 was repeated except that no aging was carried out, thereby obtaining 15 kg of the solid product. Said solid product was found to contain 2.1% by weight of the titanium atom, 39.2% by weight of the ethoxy group and 3.3% by weight of the butoxy group.

2. Production of Solid Catalyst Component

Example 1 was repeated similarly, thereby obtaining 13.5 kg of the solid catalyst component. Said solid catalyst component was found to contain 2.2% by weight of the titanium atom, 0.1% by weight of the ethoxy group, 0.2% by weight of the butoxy group and 11.8% by weight of the phthalic acid ester.

3. Polymerization of Propylene

Example 1 was repeated similarly, thereby obtaining polypropylene, which had 27,500 (g/g) of PP/Cat, 0.49% by weight of a CXS value and 0.46 g/ml of a bulk density. Polymerization results are shown in table 1.

Comparative Example 2

1. Production of Solid Product

Example 1 was repeated similarly, thereby obtaining 15 kg of the solid product. Said solid product was found to contain 2.1% by weight of the titanium atom, 38.2% by weight of the ethoxy group and 3.6% by weight of the butoxy group.

2. Production of Solid Catalyst Component

Example 1 was repeated except that the temperature of the solid product slurry in the item 2(1) of Example 1 was changed to 90° C., thereby obtaining 13.5 kg of the solid catalyst component. Said solid catalyst component was found to contain 2.0% by weight of the titanium atom, 0.1% by weight of the ethoxy group, 0.2% by weight of the butoxy group and 11.5% by weight of the phthalic acid ester.

3. Polymerization of Propylene

Example 1 was repeated similarly, thereby obtaining polypropylene, which had 34,300 (g/g) of PP/Cat, 0.32% by weight of a CXS value and 0.47 g/ml of a bulk density. Polymerization results are shown in Table 1.

TABLE 1

|  | Example | | | Comparative Example | |
| --- | --- | --- | --- | --- | --- |
|  | 1 | 2 | 3 | 1 | 2 |
| Condition for producing catalyst | | | | | |
| Aging time (hrs) | 30 | 60 | 18 | 0 | 30 |
| Temperature of slurry (° C.) (Note) | 75 | 75 | 75 | 75 | 90 |
| Polymerization result of propylene | | | | | |
| PP/Cat (g/g) | 48100 | 47500 | 41000 | 27500 | 34300 |
| CXS (% by weight) | 0.44 | 0.40 | 0.50 | 0.49 | 0.32 |
| Bulk density (g/ml) | 0.46 | 0.47 | 0.47 | 0.46 | 0.47 |

Note : "Temperature of slurry" means temperature of the slurry containing the solid product; for example, in case of Example 1, it means temperature of said slurry present in the activation vessel mentioned in the Item 2(1).

What is claimed is:

1. A process for producing a catalyst for α-olefin polymerization, which comprises the steps of:
   (1) reducing a titanium compound represented by the following formula (1) with an organomagnesium compound in the presence of an organosilicon compound having an Si—O bond to produce a reduction solid,
   (2) aging the reduction solid for at least 18 hours in an inert solvent under stirring intermittently to produce a solid product,
   (3) contacting the solid product with an ether compound, titanium tetrachloride and an organic acid halide compound, and then heating a resultant mixture to produce an organic acid halide-treated solid,
   (4) contacting the organic acid halide-treated solid with a mixture of an ether compound, titanium tetrachloride and an ester compound, or with a mixture of an ether compound and titanium tetrachloride, and then heating a resultant mixture to produce a solid catalyst component containing a titanium compound, and
   (5) contacting the solid catalyst component with an aluminum compound and an electron donor compound to produce a catalyst for α-olefin polymerization:

$$Ti(OR^1)_a X_{4-a} \quad (1)$$

wherein $R^1$ is a hydrocarbon group having 1 to 20 carbon atoms; X is a halogen atom; and a is a number satisfying $0 < a \leq 4$.

2. The process for producing a catalyst for α-olefin polymerization according to claim 1, wherein the aging in the step (2) is carried out at from −50 to 70° C.

3. The process for producing a catalyst for α-olefin polymerization according to claim 1, wherein the contacting of the solid product with an ether compound, titanium tetrachloride and an organic acid halide compound in the step (3) is carried out at 85° C. or lower.

4. The process for producing a catalyst for α-olefin polymerization according to claim 1, wherein the heating in the steps (3) and (4) is carried out at 150° C. or lower for 10 hours or shorter.

5. A process for producing an α-olefin polymer, which comprises the step of homopolymerizing an α-olefin, or copolymerizing at least one kind of an α-olefin and ethylene in the presence of a catalyst produced by a process for producing a catalyst for α-olefin polymerization according to claim 1.

* * * * *